United States Patent
Eich et al.

(10) Patent No.: US 9,739,618 B2
(45) Date of Patent: Aug. 22, 2017

(54) MULTIPLE LOCATION ELECTRONIC DEVICE COMMUNICATION

(75) Inventors: Rodger W. Eich, Holland, MI (US);
Monica Levy, Mequon, WI (US);
Michael Crowe, Colleyville, TX (US);
John Sibson, Fox Point, WI (US);
William J. Fluharty, Holland, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1023 days.

(21) Appl. No.: 13/018,405

(22) Filed: Jan. 31, 2011
(Under 37 CFR 1.47)

(65) Prior Publication Data

US 2012/0123908 A1    May 17, 2012

Related U.S. Application Data

(63) Continuation of application No. 12/444,843, filed as application No. PCT/US2007/080715 on Oct. 8, 2007, now abandoned.
(Continued)

(51) Int. Cl.
| | |
|---|---|
| *G06Q 30/00* | (2012.01) |
| *G01C 21/26* | (2006.01) |
| *B60R 25/24* | (2013.01) |
| *G06Q 30/06* | (2012.01) |
| *H04W 4/02* | (2009.01) |
| *H04L 29/08* | (2006.01) |

(52) U.S. Cl.
CPC .......... *G01C 21/26* (2013.01); *B60R 25/241* (2013.01); *G06Q 30/0641* (2013.01); *H04L 67/12* (2013.01); *H04L 67/125* (2013.01); *H04L 67/18* (2013.01); *H04L 67/28* (2013.01); *H04L 67/2838* (2013.01); *H04W 4/02* (2013.01)

(58) Field of Classification Search
CPC .......................................... G06Q 30/06–30/08
USPC .................................. 705/26–27, 26.1–27.2
See application file for complete search history.

(56) References Cited

U.S. PATENT DOCUMENTS

| | | | | |
|---|---|---|---|---|
| 6,829,478 | B1 * | 12/2004 | Layton et al. ................ | 455/428 |
| 2003/0065805 | A1 * | 4/2003 | Barnes, Jr. .................... | 709/231 |
| 2011/0019825 | A1 * | 1/2011 | Shearer ......................... | 380/270 |

FOREIGN PATENT DOCUMENTS

| | | |
|---|---|---|
| EP | 0 123 562 | 10/1984 |
| EP | 1 495 915 A1 | 1/2005 |

(Continued)

OTHER PUBLICATIONS

"Trimble Wins Japanese Anti-Earthquake Network Order Sep. 25, 1995" (Newsbytes Sep. 25, 1995) http://dialog.proquest.com/professional/docview/681632993?accountid=142257.*

(Continued)

*Primary Examiner* — Ethan D Civan
(74) *Attorney, Agent, or Firm* — Foley & Lardner LLP

(57) ABSTRACT

An in-vehicle control system for communicating data between at least one of an office control system and a residential control system including a transceiver configured to be in communication with the office control system and the residential control system. The in-vehicle control system further including a memory device in communication with the transceiver. The memory device is configured to store a data file transmitted and/or received from the office control system and the residential control system.

20 Claims, 11 Drawing Sheets

Related U.S. Application Data

(60) Provisional application No. 60/828,756, filed on Oct. 9, 2006.

(56) References Cited

FOREIGN PATENT DOCUMENTS

| WO | WO-97/31241   | 8/1997 |
|----|---------------|--------|
| WO | WO-00/10029 A | 2/2000 |

OTHER PUBLICATIONS

Martin, E.H., "Differential GPS for Fleet Base Stations with Vector Processing Mechanization" http://dialog.proquest.com/professional/docview/33260950?accountid=142257.*
International Search Report mailed Jun. 2, 2008 in PCT/US2007/080715, 2 pages.
Written Opinion of the International Searching Authority mailed Jun. 2, 2008 in PCT/US2007/080715, 6 pages.

\* cited by examiner

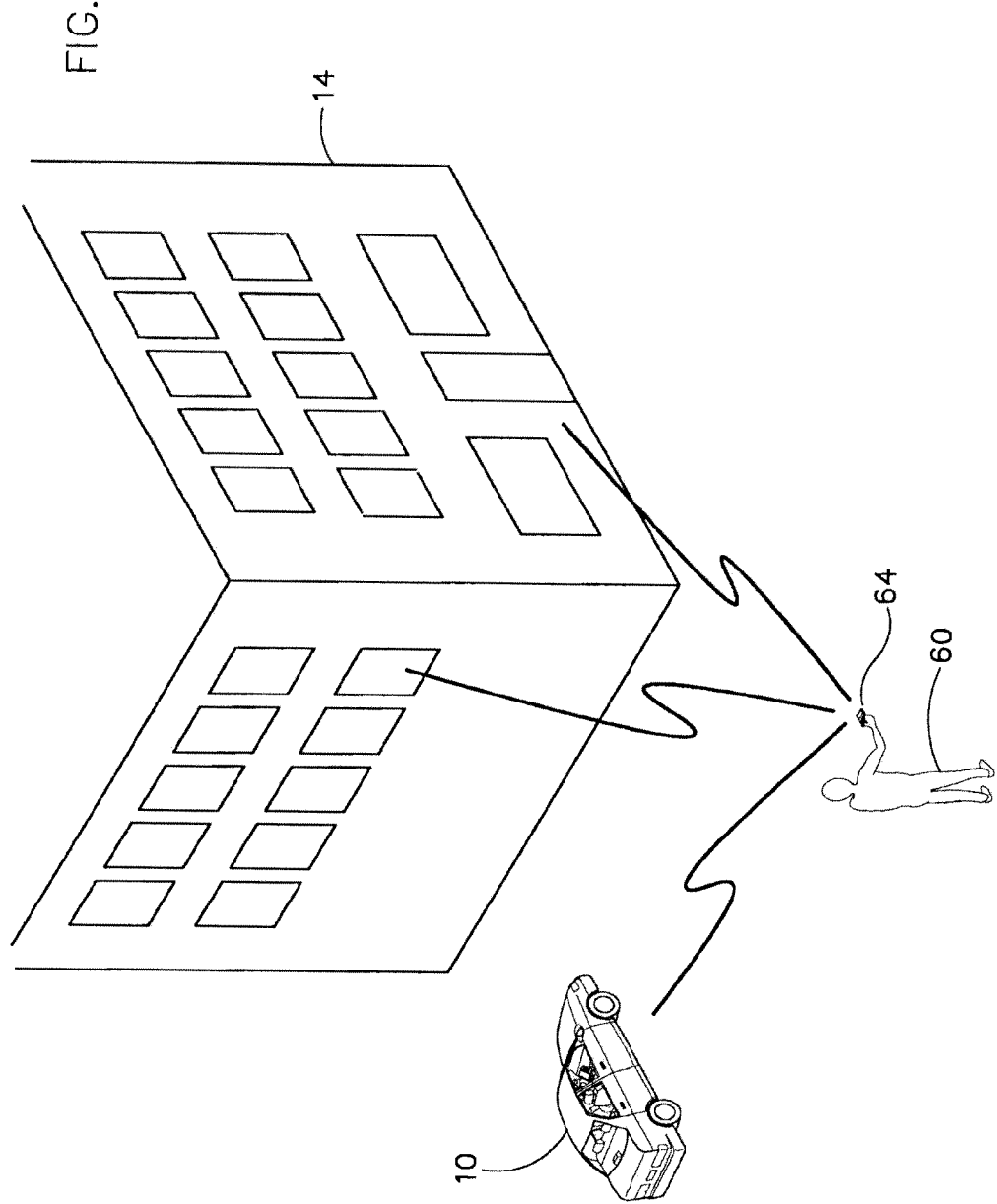

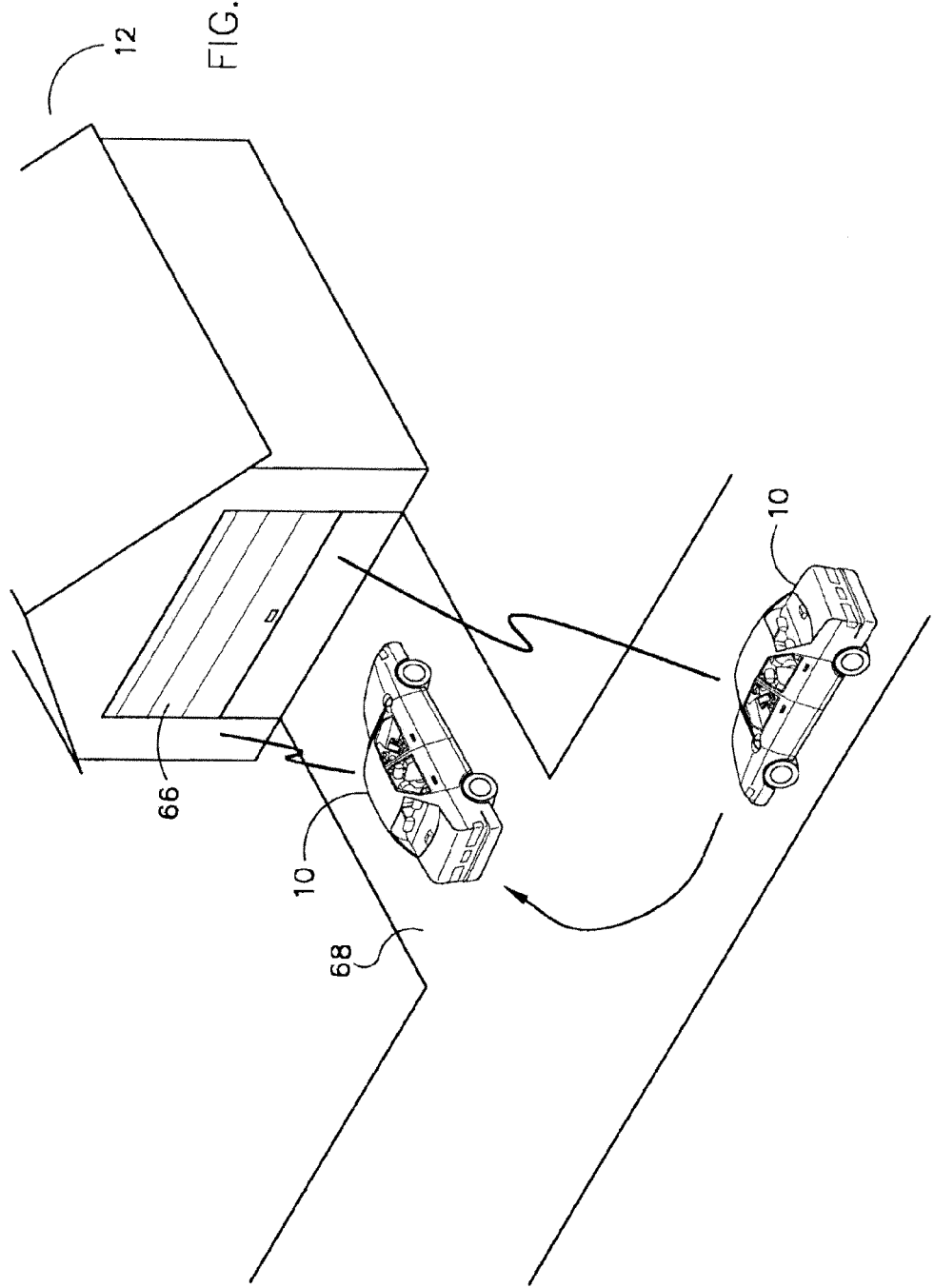

MULTIPLE LOCATION ELECTRONIC DEVICE COMMUNICATION

CROSS-REFERENCE TO RELATED PATENT APPLICATIONS

This application is a continuation of U.S. application Ser. No. 12/444,843 (National Stage of PCT/US2007/080715), filed Oct. 8, 2007, incorporated herein by reference in its entirety, which claims priority from U.S. Provisional Application No. 60/828,756, filed Oct. 9, 2006, incorporated herein by reference in its entirety.

BACKGROUND OF THE INVENTION

The present application generally relates to the field of communication between electronic devices. More specifically, the present application relates to wireless communication between electronic devices.

Vehicles may include a number of subsystems including an HVAC system, an audio system, and a computing system that may be controlled by one or more local user interfaces. Residential and office buildings may also be comprised of similar subsystems with one or more user interfaces for controlling the subsystems. In such cases, a vehicle, residential building, and office building may also be configured to include capabilities to interface with external devices such as media players, mobile phones, or other handheld/mobile devices. Vehicles, residences, and offices may further be configured to communicate with mobile devices using a wireless connection, such as a Bluetooth communications protocol, an IEEE 802.11x communications protocol, an IEEE 802.15 communications protocol, an IEEE 802.16 communications protocol, or other wireless communication technology. Some vehicles, residences, or offices may even have speech recognition capabilities, as such capabilities relate to vehicle, residential, or office control systems or the interaction with external electronic devices. However, it is noted that it would be advantageous to have a system where data communication between a vehicle, residence, and office provides access and/or control from each location to remote sources, such as mobile phones, media players, personal digital assistants, digital cameras, portable gaming devices, computer systems, the Internet, video podcasts (Vodcasts), etc., and to the systems of each location over a wireless communication network.

SUMMARY OF THE INVENTION

One embodiment relates to an in-vehicle control system for communicating data between at least one of an office control system and a residential control system including a transceiver configured to be in communication with the office control system and the residential control system. The in-vehicle control system also includes a memory device in communication with the transceiver. The memory device is configured to store a data file transmitted and/or received from the office control system and the residential control system.

One embodiment relates to a method for operating an in-vehicle control system in a vehicle for communicating with an office control system and a residential control system including transmitting a data request signal from the in-vehicle control system to at least one of the office control system and the residential control system. The method further includes receiving data from at least one of the office control system and the residential control system based on the data request signal. The method also includes storing the data received from at least one of the office control system and the residential control system.

BRIEF DESCRIPTION OF THE DRAWINGS

FIG. 10 is an illustration of utilizing the integrated system at an office building, according to an exemplary embodiment; and FIG. 11 is an illustration of utilizing the integrated system while driving towards a residential environment, according to an exemplary embodiment.

DETAILED DESCRIPTION OF THE PREFERRED EMBODIMENTS

Figure 1:
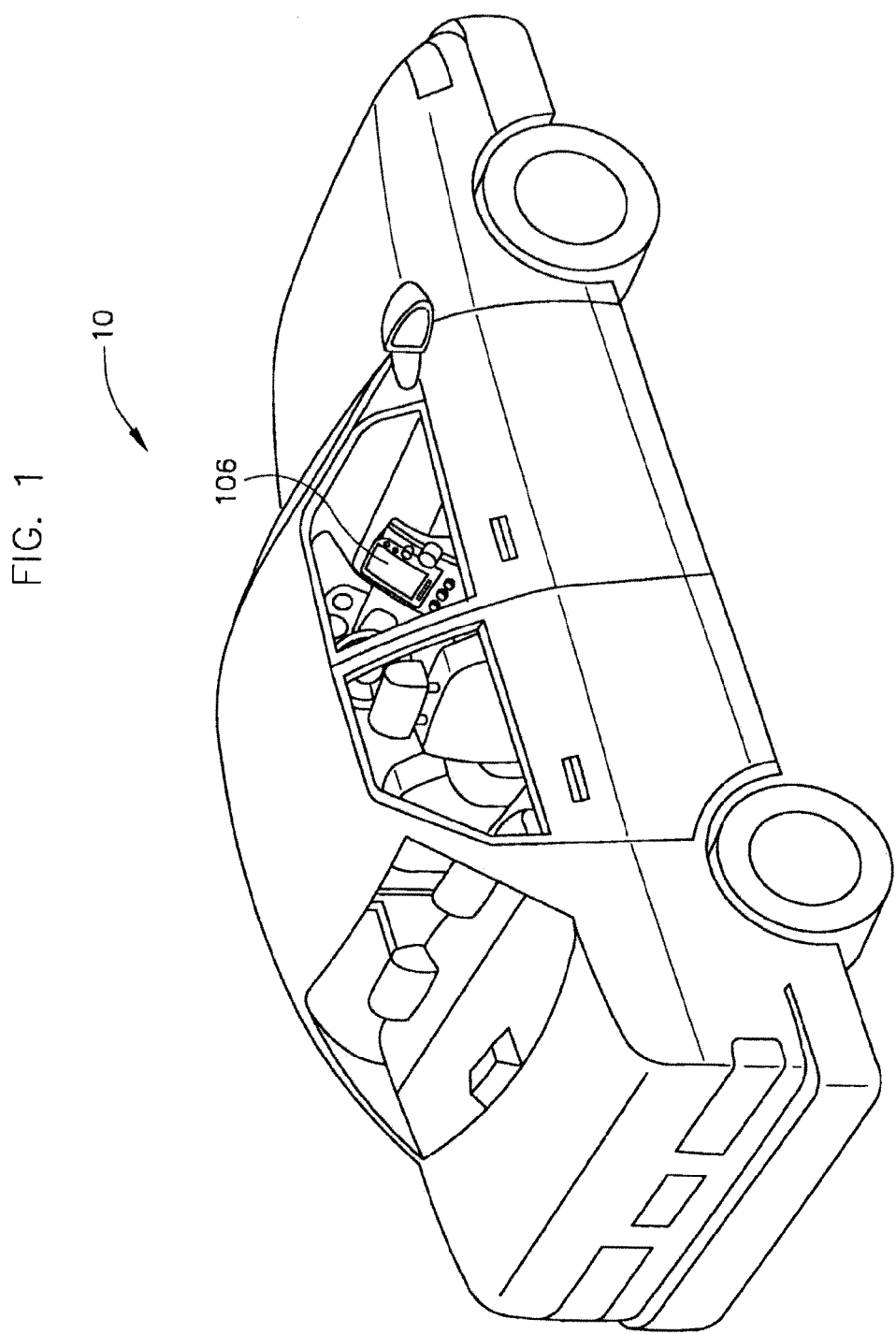
FIG. 1 is a perspective view of a motor vehicle including an in-vehicle control system, according to an exemplary embodiment.

Referring to FIG. 1, a vehicle 10 includes a number of subsystems for user convenience. Vehicle 10 generally includes an electronic compass system, a heating, ventilation, and air-conditioning system ("HVAC system"), a sound system, and an in-vehicle control system 106. The electronic compass system, HVAC system, and sound system may be coupled to in-vehicle control system 106, which is capable of controlling and monitoring the systems, automatically or by a manual user command. It is noted that in various exemplary embodiments, vehicle 10, the compass system, the HVAC system, and the sound system may be of any past, present, or future design that is capable of interacting with in-vehicle control system 106.

Referring to FIGS. 2, 3, 6, and 7, systems and methods of controlling and integrating communication between electronic devices of vehicle 10, a residential environment 12, and an office environment 14, are illustrated. The system is configured to allow automated data access and system control from each location to the other locations via a communication network 16, as described in greater detail below.

Figure 2:
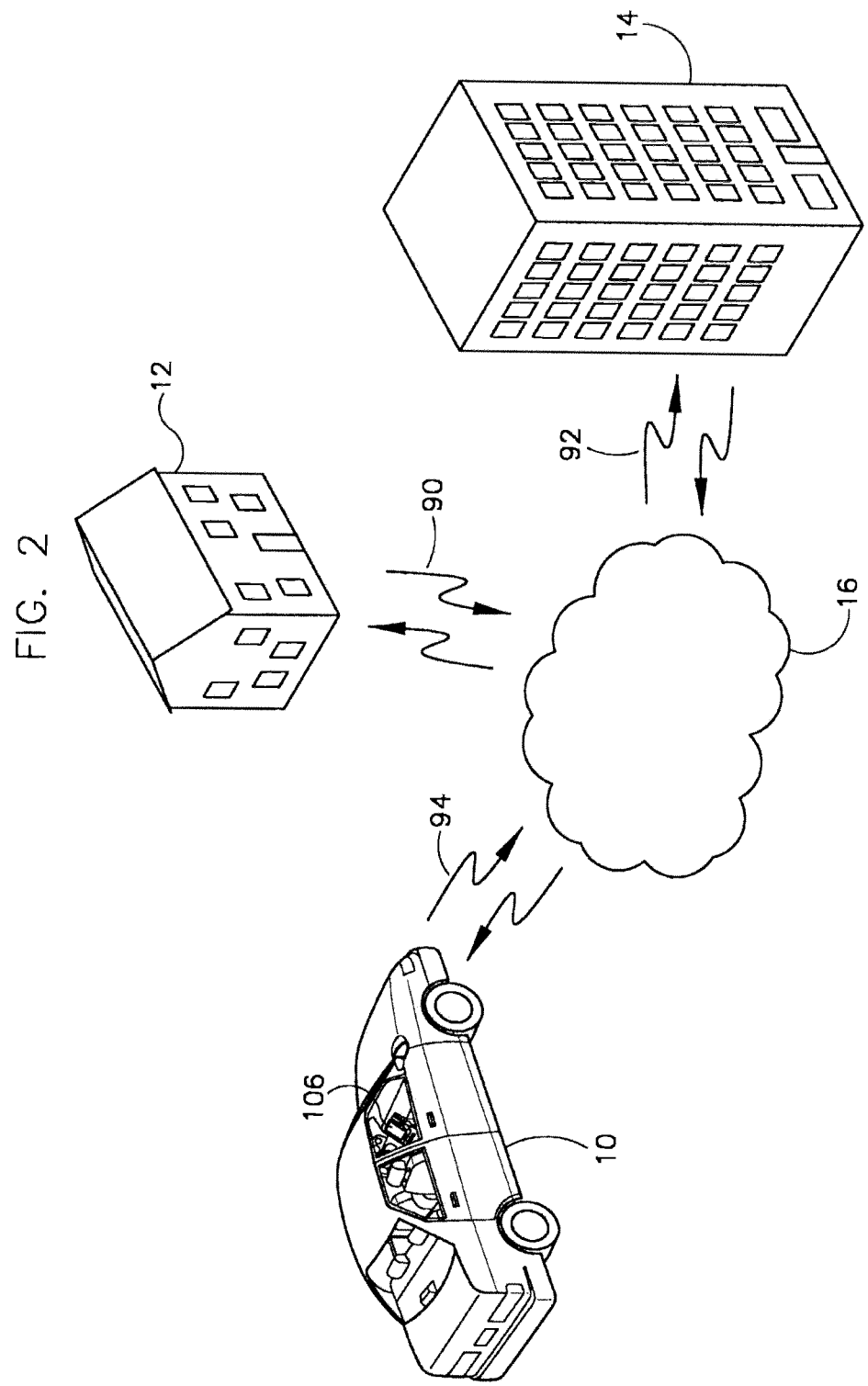
FIG. 2 is schematic drawing illustrating the concept of vehicle, residential, and office control system integration, according to one exemplary embodiment.
Figure 3:
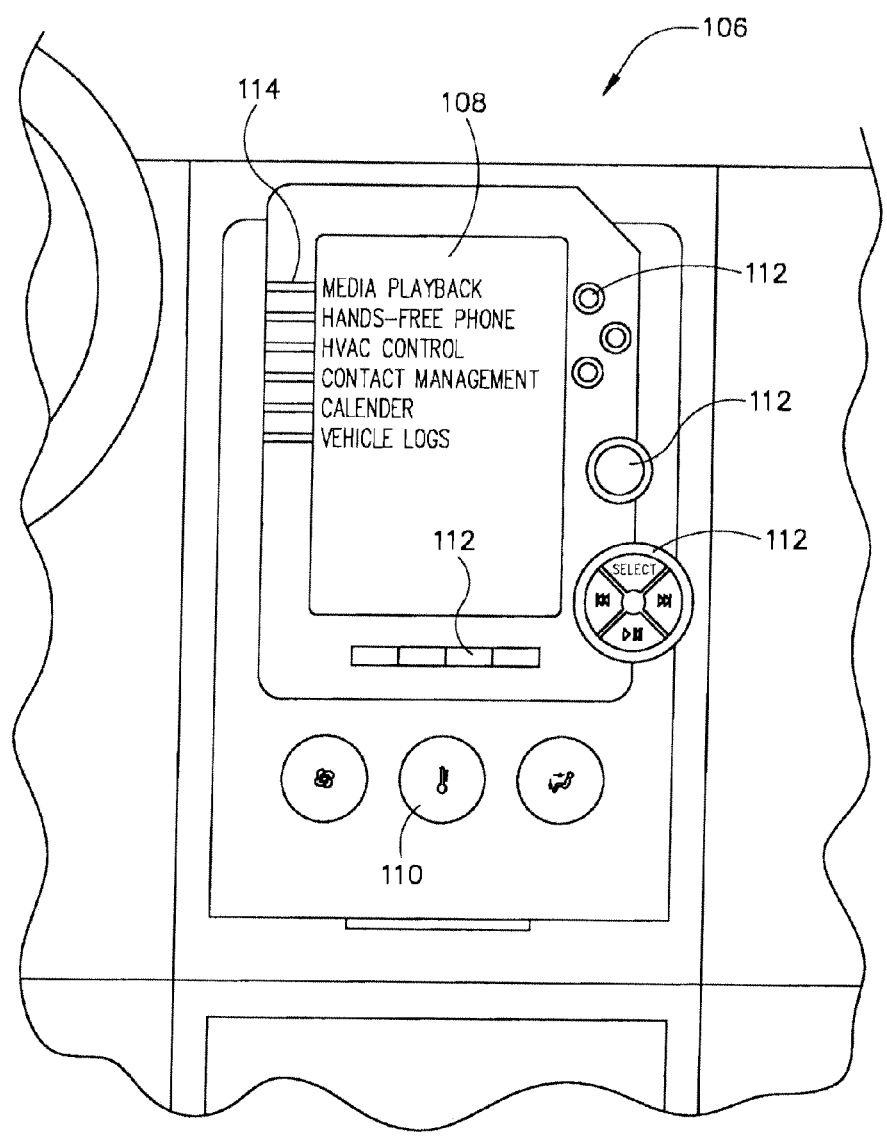
FIG. 3 is a front elevation view of the user interface of the in-vehicle control system of FIG. 1, according to an exemplary embodiment.

Referring to FIGS. 2 and 3, vehicle 10 typically includes in-vehicle control system 106 configured to communicate with remote locations such as residential environment 12, office environment 14 or personal mobile electronic device (see FIGS. 6 and 7) over communication network 16.

In FIG. 2, residential environment 12 may be in communication with communication network 16 by utilizing a residential communication link 90. In-vehicle control system 106 may be in communication with communication network 16 utilizing an in-vehicle communication link 94. Office environment 14 may be in communication with communication network 16 by utilizing an office communication link 92.

In FIG. 3, in-vehicle control system 106 includes an output display 108, one or more knobs 112, and one or more tactile user inputs or pushbuttons 114, which facilitate controlling various vehicle functions. The output display may be configured to display data related to the control of the vehicle functions. In one exemplary embodiment, output display 108 may be a touch-screen display, while in other exemplary embodiments, may be any other non-touch sensitive display. In still other exemplary embodiments, output display 108 may be of any technology (e.g. LCD, DLP, plasma, CRT), configuration (e.g. portrait or landscape), or shape (e.g. polygonal, curved, curvilinear). Knobs 112 and pushbuttons 114 may be configured: (i) to control functions of the HVAC system such as fan speed, cabin temperature, or routing of air flow, (ii) to control playback of media files over the sound system, (iii) to control retrieval of phonebook entries, (iv) control a remote system such as in a residence or office, or (v) to control any other desired vehicle function. Pushbuttons 114 allow for the selection and display of various functions of in-vehicle control system 106 including HVAC system control, sound system control, hands-free phone use, contact or address/phone book management, calendar viewing/modification, vehicle data logging, and communication with a remote system such as residence environment 12 or office environment 14.

In-vehicle control system 106 is capable of accessing data files from a remote source over communication network 16. For example, in-vehicle control system 106 may access media data files, phonebook data files, calendar data, or any other accessible data of use by in-vehicle control system 106 from a mobile electronic device or from a remote system such as in residence environment 12 or office environment 14 (see FIGS. 6-1)). In-vehicle control system 106 may be configured to establish a communication network with the remote source. In one exemplary embodiment, in-vehicle control system 106 may establish a wireless communication network such as with an IEEE 802.11 protocol, an IEEE 802.15 protocol, an IEEE 802.16 protocol, a cellular signal, a Shared Wireless Access Protocol-Cord Access (SWAP-CA) protocol, an infrared protocol, or any other suitable wireless technology. Depending on the proximity of devices, in-vehicle control system 106 may switch between protocols for improved signal strength and data integrity. In another exemplary embodiment, in-vehicle control system 106 may establish a wired communication link such as with USB technology, IEEE 1394 technology, optical technology, other serial or parallel port technology, or any other suitable wired link. In-vehicle control system 106 may receive one or more data files from the remote source. In various exemplary embodiments, the data files may include text, numeric data, or any combination thereof. In various exemplary embodiments, the remote sources may include one or more electronic devices, for example a personal digital assistant (PDA) 28, a mobile phone 30, a media player 32, a pager 34, a personal navigation device (PND) 36, a personal video record (PVR) 38, a residential control system 50, an office control system 18, or any other system device that may be configured to control or access data.

Figure 4:
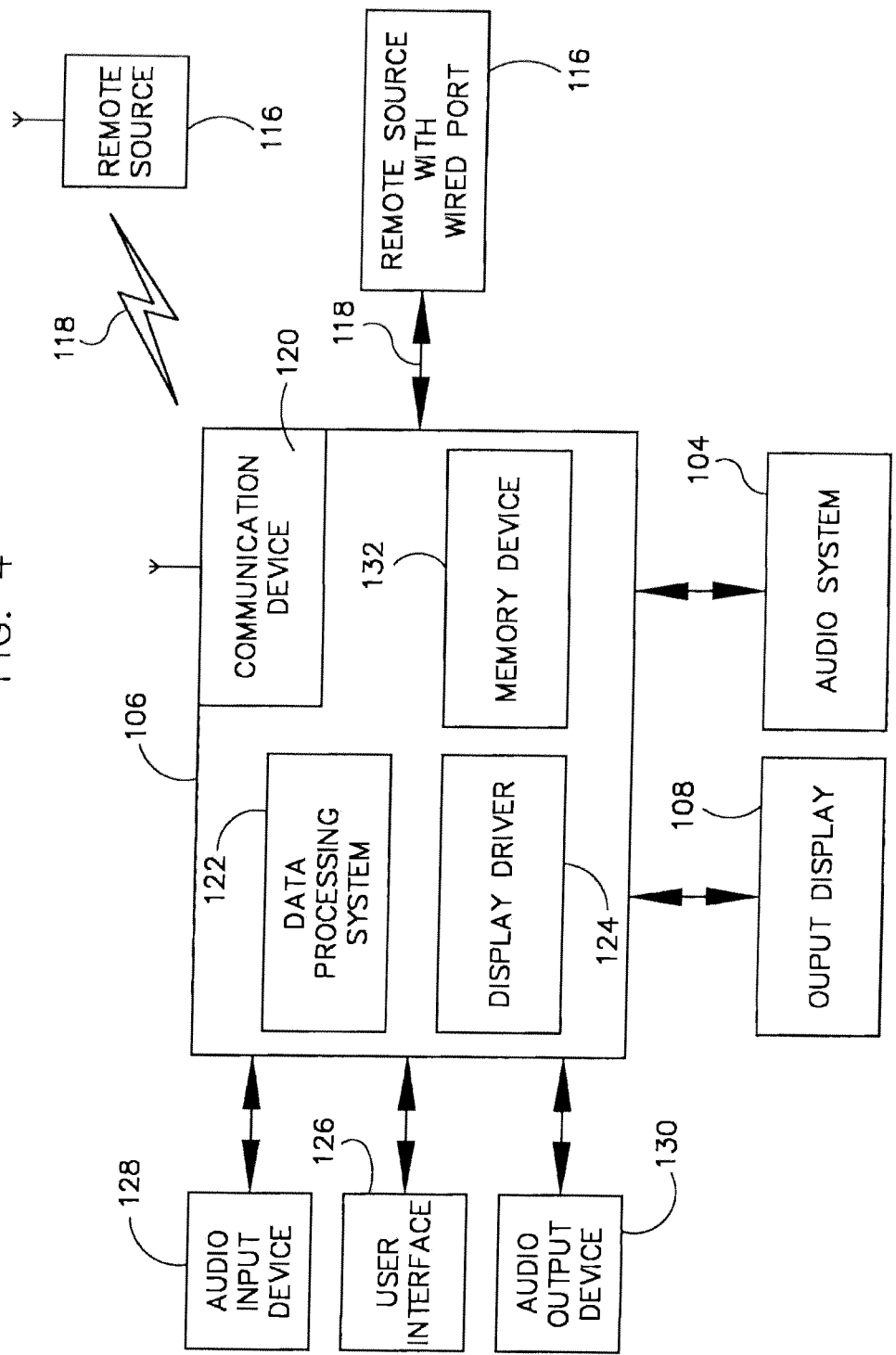
FIG. 4 is a block diagram of the in-vehicle control system of FIG. 1, according to an exemplary embodiment.

Referring to FIG. 4, in-vehicle control system 106 is capable of accessing data files from a first remote source 116 over a first communication link 118. For example, in-vehicle control system 106 may access residential control system 50, office control system 18, or any other system device that may be configured to control or access data. In-vehicle control system 106 may also access media files, phonebook data files, calendar data, or any other accessible data for use by in-vehicle control system 106. In-vehicle control system 106 may also send requests, receive files, send and receive commands, and send and/or receive any other type of data to and/or from first remote source 116 over first communications link 118.

In-vehicle control system 106 may include a communication device 120, a data processing system 122, a display driver 124, a user interface 126, an audio input device 128, an audio output device 130, an output display 208, and a memory device 132.

Communication device 120 may be configured to establish first communication link 118 with first remote source 116. In one exemplary embodiment, in-vehicle control system 106 may establish a wireless communication link, such as with Bluetooth communications protocol, an IEEE 802.11 protocol, an IEEE 802.16 protocol, a cellular signal, a Shared Wireless Access Protocol-Cord Access (SWAP-CA) protocol, a wireless USB protocol, or any other suitable wireless technology. In another exemplary embodiment, in-vehicle control system 106 may establish a wired communication link, such as with USB technology, IEEE 1394 technology, optical technology, other serial or parallel port technology, or any other suitable wired link. Communication device 120 may receive one or more data files from first remote source 116. In various exemplary embodiments, the data files may include text, numeric data, audio, video, program data, command data, information data, coordinate data, image data, streaming media, or any combination thereof.

Data processing system 122 is coupled to communications device 120 and is generally configured to control each function of in-vehicle control system 106. Data processing system 122 may facilitate speech recognition capabilities of in-vehicle control system 106 for the convenience of the user. Data processing system 122 may include digital or analog processing components and/or be of any past, present, or future design that facilitates control or features of in-vehicle control system 106. Data processing system 122 may be a single data processing device or multiple data processing device. Data processing system 122 may be a data processing device having data processing sub-devices or components. Data processing system 122 may include any combination of program software and hardware capable of providing control, display, communications, input and output features to the vehicle. Data processing system 122 may coordinate the various devices, components and features of in-vehicle control system 106 (e.g., communications device 120, output display 108, display driver 124, memory device 132, audio system 104, user interface 128, audio input device 128, audio output device 130, etc).

Display driver 124 is coupled to output display 108 and may be configured to provide an electronic signal to the output display. In one exemplary embodiment, the electronic signal may include the text and/or numeric data of the data files, while in other exemplary embodiments any other desired data may be included with the text and/or numeric data or by itself in the electronic signal to the output display.

In another exemplary embodiment, display driver 124 may be configured to control output display 108 with touch-screen capabilities, while in other exemplary embodiments, display driver 124 may be configured to output display 108 without making use of touch-screen capabilities. Display driver 124 may include any number of functions, software or hardware to facilitate the control and display of images on output display 108. In still other exemplary embodiments, display driver 124 may be of any past, present, or future design that allows for the control of output display 108.

Figure 5:
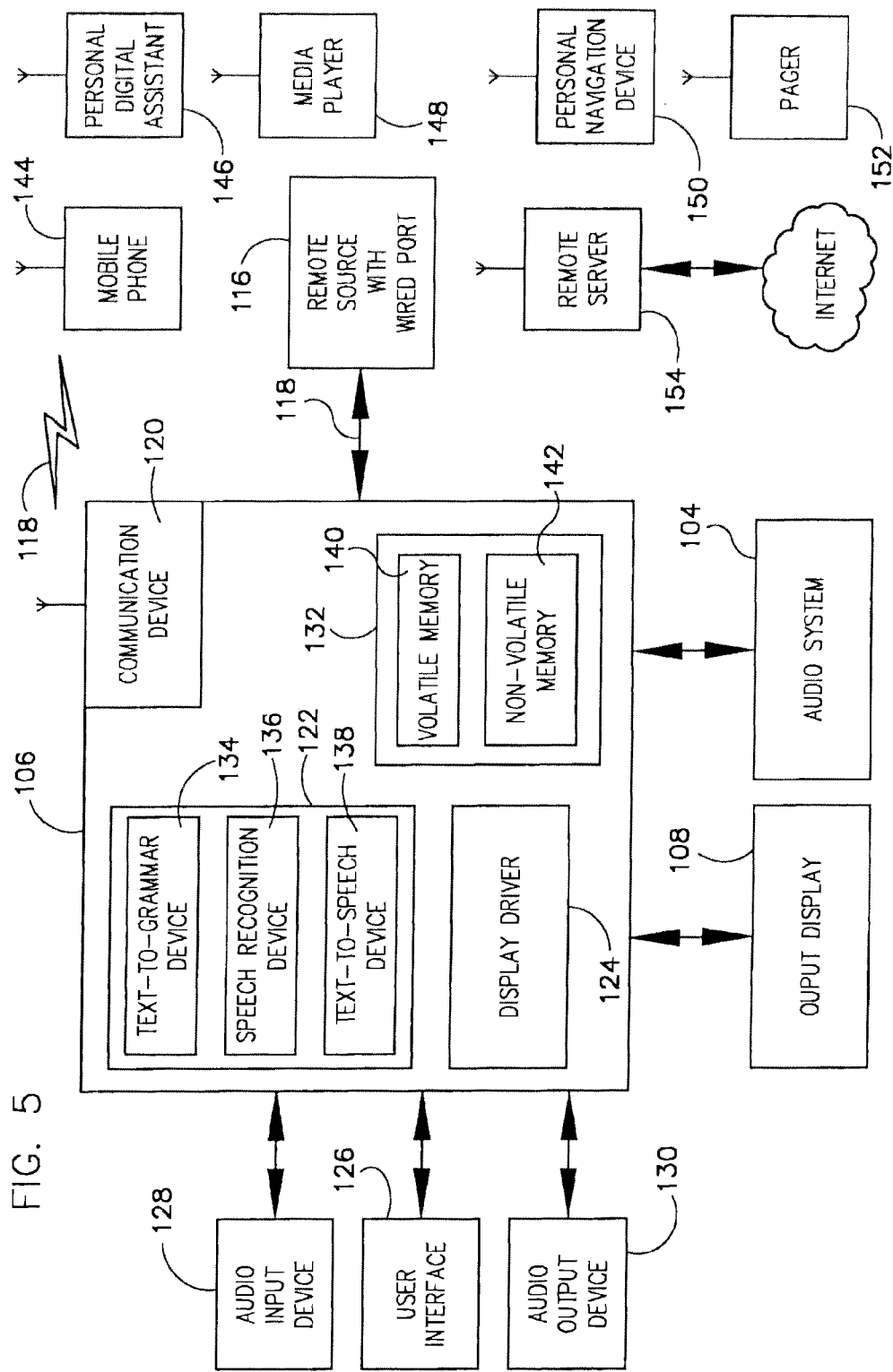
FIG. 5 is another block diagram of the in-vehicle control system of FIG. 1 that includes a speech recognition system, according to an exemplary embodiment.

Referring to FIG. 5, audio input device 128, for example a microphone, is configured to receive the utterance of a user for transmission to data processing system 122 for speech recognition so that the functions of in-vehicle control system 106 may be operated by voice command. Audio output device 130, for example a built-in speaker, is configured to provide the user with an audio prompt of various functions, such as user selection confirmation. In-vehicle control system 106 may further include a microphone, a data processing system, and a speaker. The microphone may be configured to receive a user utterance, such as a vocal command. The data processing system may include a speech recognition device configured to convert the user utterance into a textual representation using a speech-to-text engine for use by the vehicle control system, for example to recognize and process vocal commands. The speech recognition device may also be configured to convert text to an phonemic representation using a text-to-speech engine. The speaker may be configured to provide an audible prompt to the user for various functions, such as to provide output of a phonemic representation.

Memory device 132 is configured to store data accessed by in-vehicle control system 106. For example, memory device 132 may store data input by remote source 116, data created by data processing system 122 that may be used later, intermediate data of use in current calculation or process, or any other data of use by in-vehicle control system 106.

Data processing system 122 may be configured to include a text-to-grammar device 134, a speech recognition device 136, and a text-to-speech device 138. Data processing system 122 may include any number of additional hardware modules, software modules, or processing devices (e.g., additional graphics processors, communications processors, etc.).

Text-to-grammar device 134 may he coupled to communications device 120 and is generally configured to generate a phonemic representation of the text and/or numeric data of each of the data files received by communications device 120 from remote source 116. The phonetic representation of the text and/or numeric data of each data file may be configured to facilitate speech recognition of each data file. After conversion of a data file to a phonetic representation, the data file may be accessed via an oral input command received by speech recognition device 136 via audio input device 128. According to an exemplary embodiment, text-to-grammar device 154 may be able to provide phonemic representations of information received from a remote source.

Speech recognition device 136 is typically configured to receive an oral input command from a user via audio input device 128. Speech recognition device compares the received oral input command to a set of predetermined input commands, which may have been configured by text-to-grammar device 134. In various exemplary embodiments, the input commands may be related to directional information, system performance characteristics or system parameter modifications regarding the electronic compass system, the playback of a media file, the dialing or input of a phone book entry, the entry or listing of calendar or contact data, the control of the HVAC system, or any other desired function to be performed on data. Speech recognition device 136 may determine an appropriate response to the oral input command received from the user. For example, whether the oral input command is a valid or invalid instruction, what command to execute, or any other appropriate response. According to an exemplary embodiment, speech recognition device 136 may be able to trigger or activate a display reproduction mode when certain commands are recognized. Furthermore, speech recognition device 136 may be able to pass commands to first remote device 116 to facilitate interactive control of a remote source via a communications link.

Text-to-speech device 138 may be configured to convert the text and/or numeric data of each data file received from first remote source 116 into an audible speech representation. This functionality may allow in-vehicle control system 106 to audibly give data to the user via audio output device 130 or the audio system 104. For example, in-vehicle control system 106 may repeat a user selected function back to the user, provide navigational information, announce directions, announce menu options, announce media file information, provide phonebook or contact information, or other information related to data stored in memory 132, first remote source 116, remote server 154, etc. According to an exemplary embodiment, text-to-speech device 138 may be able to provide an audible speech representation of information received from a remote source.

Memory device 132 includes both a volatile memory 140 and a non-volatile memory 142. Volatile memory 140 may be configured so that the contents stored therein may be erased during each power cycle of the in-vehicle control system 106 or vehicle 100. Non-volatile memory 142 may be configured so that the contents stored therein may be retained across power cycles, such that upon in-vehicle control system 106 power-up, data from previous system use remains available for the user. According to an exemplary embodiment non-volatile memory 142 may store one or more vehicle accessory magnetic field value characteristic profiles, magnetic field profiles, user profiles, display profiles, communications profiles, or any other type of user or system setting file.

According to an exemplary embodiment, first remote source 116 may be any suitable remote source that includes a transceiver and is able to interface with in-vehicle control system 106 over first communications link 118 (either wireless or wired). In various exemplary embodiments, first remote source 116 may be one or more of a mobile phone 144, a personal digital assistant (PDA) 146, a media player 148, a personal navigation device (PND) 150, a remote server 154 that may be coupled to the Internet, or various other remote sources. First remote source 116 may have a storage device, one or more processing devices, and one or more communications devices. According to an exemplary embodiment, first remote source 116 is a global positioning system capable remote source. According to various exemplary embodiments, first remote source 116 may connect to the Internet or any other remote source with a first communications device while communicating with the control system using a second communications device.

Figure 6:
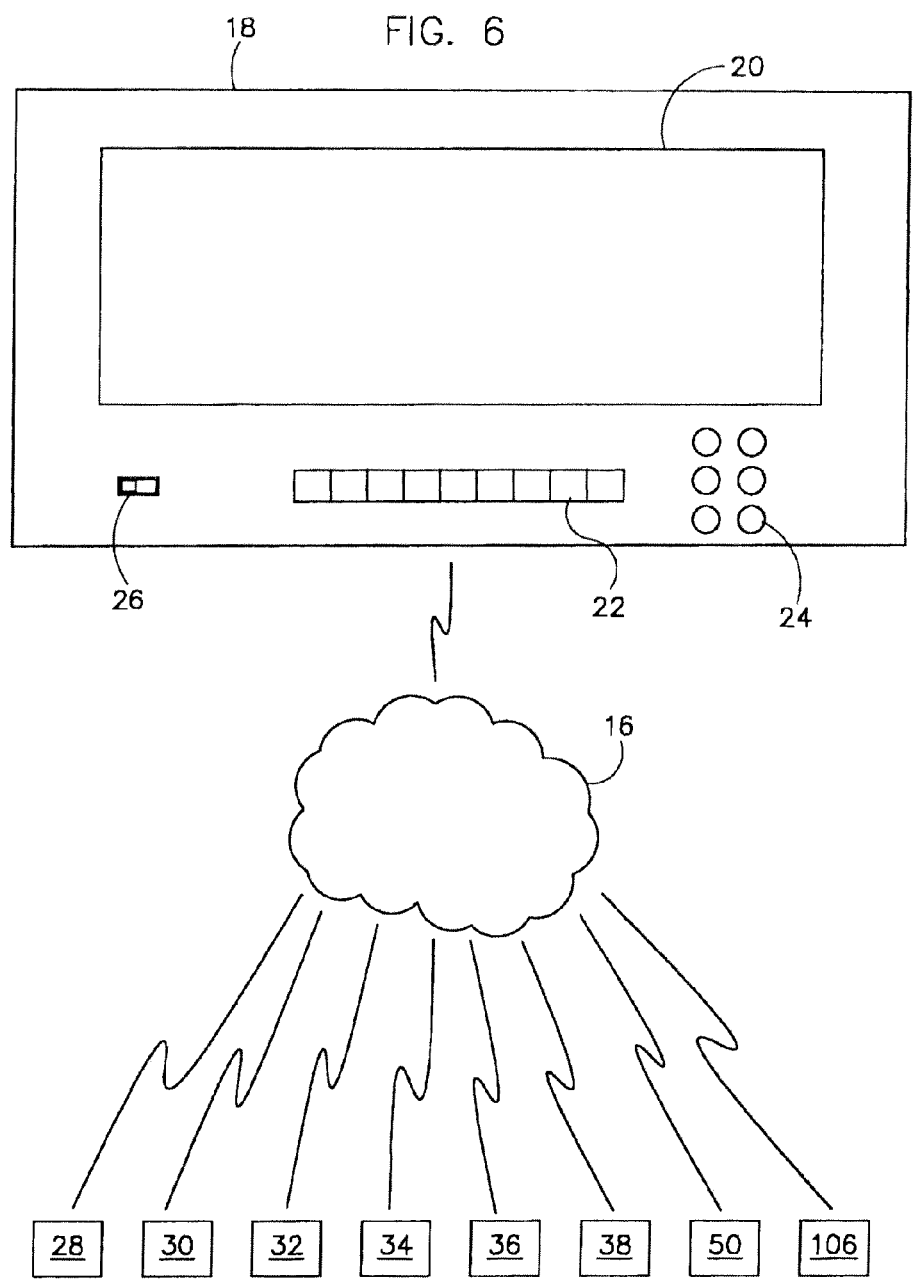
FIG. 6 is a schematic drawing illustrating a control system configured for an office environment and interaction between the office and mobile electronic devices, according to one exemplary embodiment of FIG. 2.

Referring to FIG. 6, office environment 14 may include office control system 18 configured to communicate with remote locations such as residence environment 12, vehicle 10, or personal mobile electronic device over communication network 16. Office control system 18 may include an office control system output display 20, and one or more office control system knobs 24, office control system tactile user inputs or pushbuttons 26 and/or an office control system keypad 22, which facilitate controlling various office functions. Office control system output display 20 may be configured to display data related to the control of the office functions. In one exemplary embodiment, office control system output display 20 may be a touch-screen display, while in other exemplary embodiments, may be any other non-touch sensitive display. In still other exemplary embodiments, office control system output display 20 may be of any technology (e.g. LCD, DLP, plasma, CRT), configuration (e.g. portrait or landscape), or shape (e.g. polygonal, curved, curvilinear). Office control system knobs 24, office control system pushbuttons 26, and office control system keypad 22 may be configured: (i) to control functions of the HVAC system such as fan speed, room temperature, or routing of air flow, (ii) to control manipulation, editing, and communication of data files, (iii) control a remote system such as in a residence or vehicle, or (iv) to control any other desired office function. Office control system pushbuttons 26 may allow for the selection and display of various functions of office control system 18 including HVAC system control, computer system control, data management, calendar viewing/modification, and communication with a remote system such as residence environment 12 or vehicle 10. Office control system keypad 22 may be a virtual keypad or a physical keypad.

Office control system 18 is capable of accessing data files from remote source residential control system 50, in-vehicle control system 106 or other sources) over communication network 16. For example, office control system 18 may access work product data files, phonebook data files, calendar data, or any other accessible data of use by office control system 18 from a mobile electronic device or from a remote system such as in residence environment 12 or vehicle 10. Office control system 18 may be configured to establish a communication network with the remote source. In one exemplary embodiment, the office control system may establish a wireless communication network such as with a wireless fidelity (WiFi) connection, an IEEE 802.11 protocol, an IEEE 802.15 protocol, an IEEE 802.16 protocol, a cellular signal, a Shared Wireless Access Protocol-Cord Access (SWAP-CA) protocol, an infrared protocol, or any other suitable wireless technology. Depending on the proximity of devices, in-vehicle control system 106 may switch between protocols for improved signal strength and data integrity. In another exemplary embodiment, office control system 18 may establish a wired communication link such as with USB technology, IEEE 1394 technology, optical technology, other serial or parallel port technology, or any other suitable wired link. Office control system 18 may receive one or more data files from the remote source. In various exemplary embodiments, the data files may include text, numeric data, or any combination thereof In various exemplary embodiments, the remote sources may include one or more electronic devices, for example personal digital assistant (PDA) 28, mobile phone 30, media player 32, pager 34, personal navigation device (PND) 36, personal video record (PVR) 38, residential control system 50, in-vehicle control system 106, or any other system device that may be configured to control or access data.

Office control system 18 may further include a microphone, a data processing system, and a speaker. The microphone may be configured to receive a user utterance, such as a vocal command. The data processing system may include a speech recognition device configured to convert the user utterance into a textual representation using a speech-to-text engine for use by the vehicle control system, for example to recognize and process vocal commands. The speech recognition device may also be configured to convert text to an phonemic representation using a text-to-speech engine. The speaker may be configured to provide an audible prompt to the user for various functions, such as to provide output of a phonemic representation.

Figure 7:
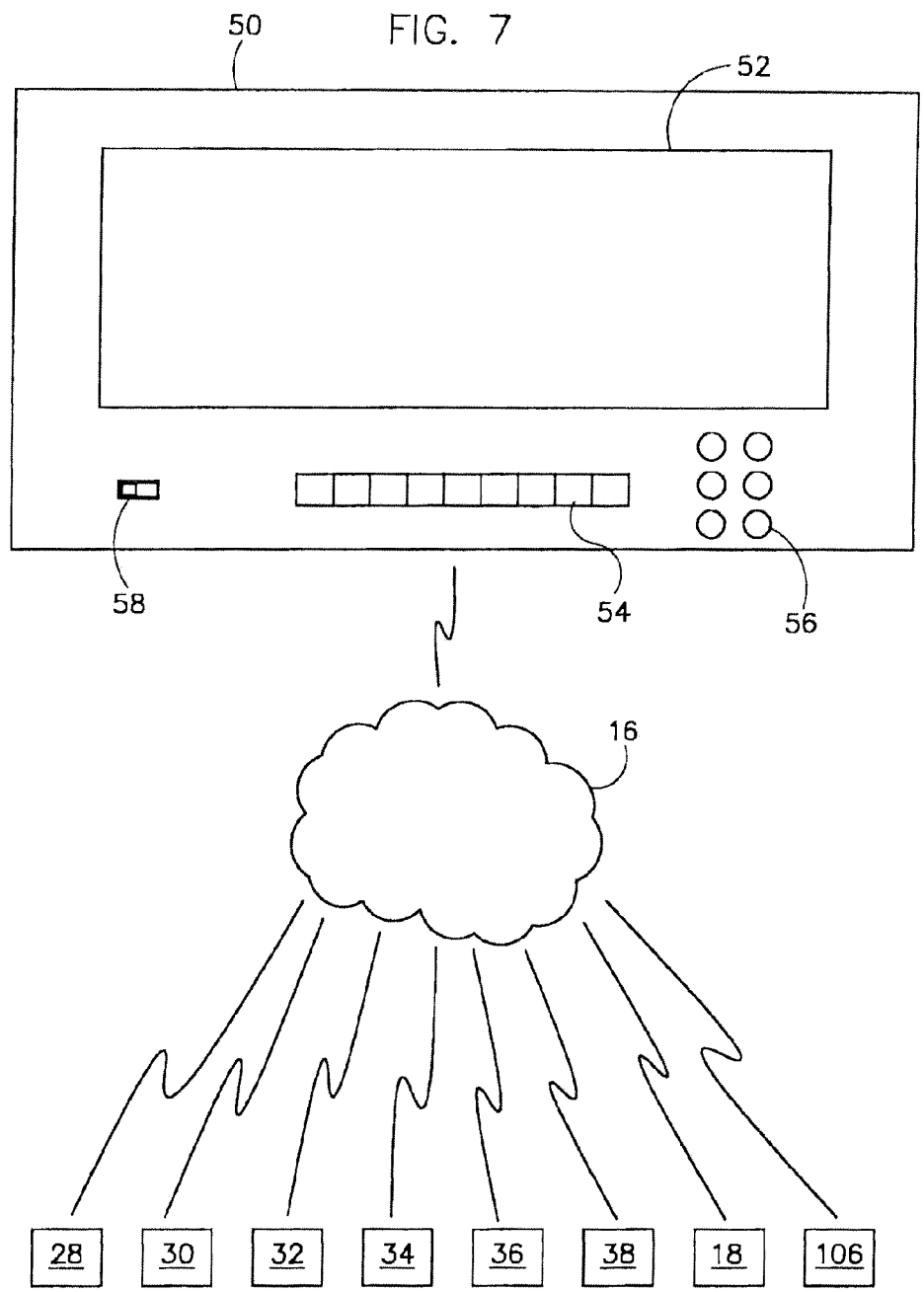
FIG. 7 is a schematic drawing illustrating a control system configured for a residential environment and interaction between the residential and mobile electronic devices, according to one exemplary embodiment of FIG. 2.

Referring to FIG. 7, residence environment 12 may include residential control system 50 configured to communicate with remote locations such as office environment 14, vehicle 10, or personal mobile electronic device over communication network 16.

Residential control system 50 may include a residential control system output display 52, and one or more residential control system knobs 56 or residential control system tactile user inputs or pushbuttons 58, or a residential control system keypad 54, which facilitate controlling various residential functions. Residential control system output display 52 may be configured to display data related to the control of the residence functions. In one exemplary embodiment, residential control system output display 52 may be a touch-screen display, while in other exemplary embodiments, may be any other non-touch sensitive display. In still other exemplary embodiments, residential control system output display 52 may be of any technology (e.g. LCD, DLP, plasma, CRT), configuration (e.g. portrait or landscape), or shape (e.g. polygonal, curved, curvilinear). Residential control system knobs 56, residential control system pushbuttons 58, and residential control system keypad 54 may be configured: (i) to control functions of the HVAC system such as fan speed, room temperature, or routing of air flow, (ii) to control playback of media data files, (iii) to control retrieval of phonebook entries, (iv) control a remote system such as in an office or vehicle, or (v) to control any other desired residential function. Residential control system pushbuttons 58 may allow for the selection and display of various functions of residential control system 50 including HVAC system control, media playback control, computer system control, hands-free phone use, contact or address/phone book management, calendar viewing/modification, and communication with a remote system such as office environment 14 or vehicle 10.

Residential control system 50 is capable of accessing data files from a remote source over communication network 16. For example, residential control system 50 may access work product data files, phonebook data files, calendar data, or any other accessible data of use by residential control system 50 from a mobile electronic device or from a remote system such as in office environment 14 or vehicle 10. Residential control system 50 may be configured to establish a communication network with the remote source. In one exemplary embodiment, the residential control system may establish a wireless communication network such as with an IEEE 802.11 protocol, an IEEE 802.15 protocol, an IEEE 802.16 protocol, a cellular signal, a Shared Wireless Access Protocol-Cord Access (SWAP-CA) protocol, an infrared protocol, or any other suitable wireless technology. Depending on the proximity of devices, in-vehicle control system 106 may switch between protocols for improved signal strength and data integrity. In another exemplary embodiment, the residential control system may establish a wired communication link such as with USB technology, IEEE 1394 technology, optical technology, other serial or parallel port technology, or any other suitable wired link. Residential control system 50 may receive one or more data files from the remote source. In various exemplary embodiments, the data files may include text, numeric data, or any combination thereof.

Residential control system 50 may further include a microphone, a data processing system, and a speaker. The microphone may be configured to receive a user utterance, such as a vocal command. The data processing system may include a speech recognition device configured to convert the user utterance into a textual representation using a speech-to-text engine for use by in-vehicle control system 106, for example to recognize and process vocal commands. The speech recognition device may also be configured to convert text to an phonemic representation using a text-to-speech engine. The speaker may be configured to provide an audible prompt to the user for various functions, such as to provide output of a phonemic representation.

Figure 8:
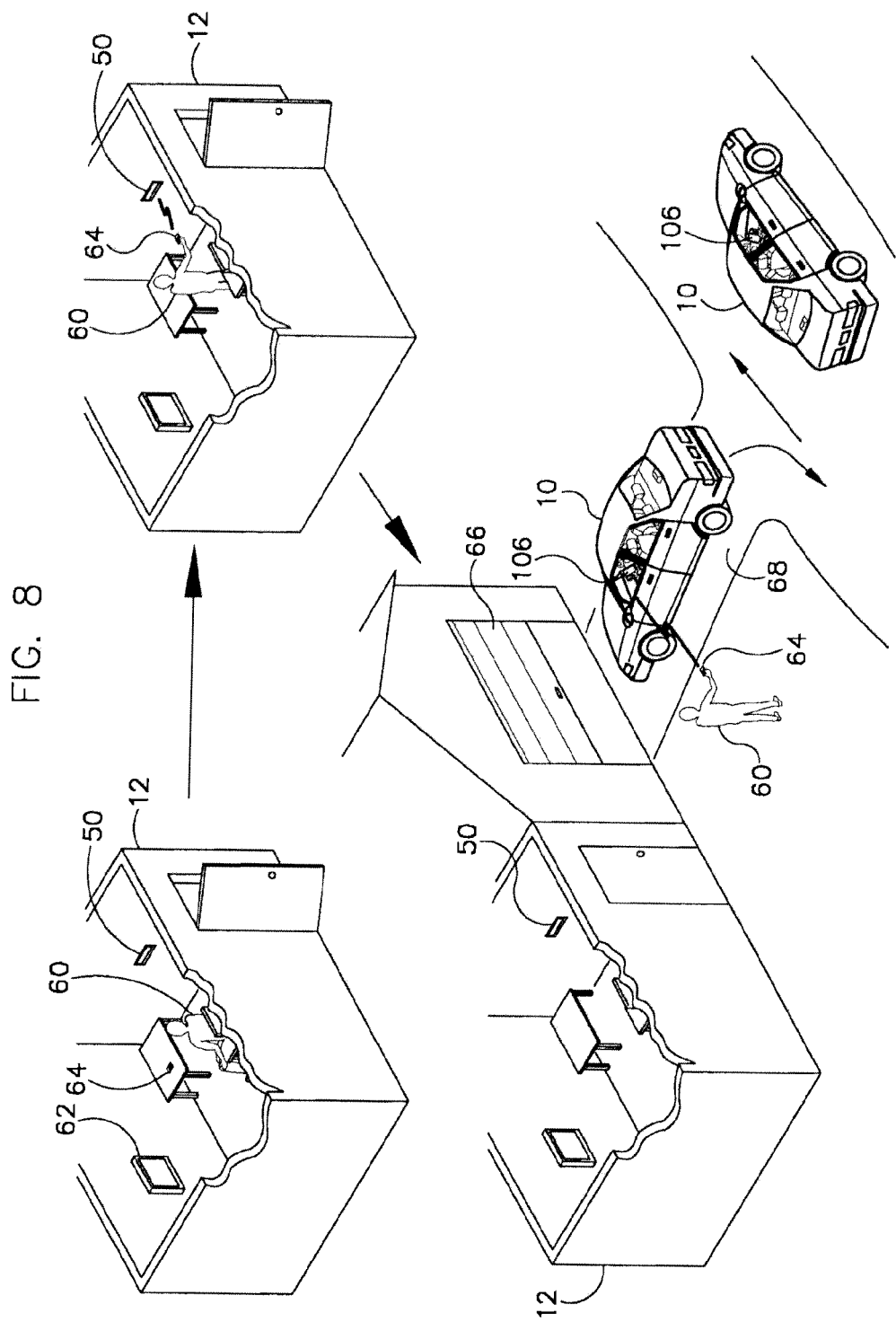
FIG. 8 is an illustration of utilizing the integrated system at a residential building, according to an exemplary embodiment.

Referring to FIG. 8, a detailed exemplary embodiment of a typical interaction of in-vehicle control system 106, residence control system 50, and office control system 18 is illustrated and described. It is noted that while a particular exemplary embodiment is given, this example does not limit the scope of the possible control system integration and interaction as other exemplary embodiments may exist. For example, while the embodiment below generally discusses the use of wireless networks, in each instance, a wired network could also be used.

In FIG. 8, a user 60 may prepare for a commute to work each morning. User 60 may turn on an electronic device 62, for example a television, to watch or hear various portions of a media broadcast while preparing to go to work.

User 60 while preparing to depart from the user's 60 residence, user 60 may collect his or her mobile electronic device or devices 64 that have been charging or synchronizing information with residential electronic devices overnight using either a wired or wireless network as described above. According to the exemplary embodiment, mobile electronic devices 64 may include personal digital assistant (PDA) 28, mobile phone 30, media player 32, pager 34, personal navigation device (PND) 36, personal video record (PVR) 38, or any other electronic device that is sufficiently mobile for the user to be capable of carrying. Examples of synchronized information may include contact information, task information calendar information, digital song data, digital song information, point-of-interest (P01) information, or any other information that user 60 would like synchronized to any capable mobile electronic device 64.

User 60 may manually select a data file on residential control system 50 to upload to mobile electronic device 64 or to vehicle 10. A data file could include map information, driving directions, weather reports, etc. For example, user 60 may wish to know more about a media broadcast of interest and thus may select the news report for upload to mobile electronic device 64 or vehicle 10 over wireless communication network 16. For example, to upload a news report to vehicle 10, user 60 may select and drag the appropriate file to an icon representing vehicle 10. It is noted that while residential control system 50 is shown to include a touch screen that allows user 60 selection and manipulation of information via use of a finger or tactile instrument, in other exemplary embodiments, user 60 may select a file using an accessory such as a mouse or by a vocal command recognized by user's 60 utterance.

User 60 selects a file to be downloaded to vehicle 10, the file may be transferred over any appropriate wireless network, as described above. The file may be downloaded by in-vehicle control system 106 within vehicle 10 for later viewing or manipulation, according to an exemplary embodiment.

User 60 leaves residential environment 12 and approaches vehicle 10, one or more mobile electronic devices 64 may automatically communicate with vehicle 10 over a wireless network once within a predefined proximity. For example, mobile electronic devices 64 may transmit a signal to unlock the vehicle doors and/or start vehicle 10. Once vehicle 10 is started, mobile electronic devices 64 may synchronize with in-vehicle control system 106 to transmit a signal that opens a garage door 66 and/or verify that the doors and locks of residential environment 12 are secure as well as activate fire and security alarms.

User 60 pulls out of a driveway 68 in vehicle 10, data content may automatically be displayed on or played audibly by in-vehicle control system 106. For example, weather data, news data, navigation data, media data, etc. may be displayed or played according to predefined settings.

Figure 9A:
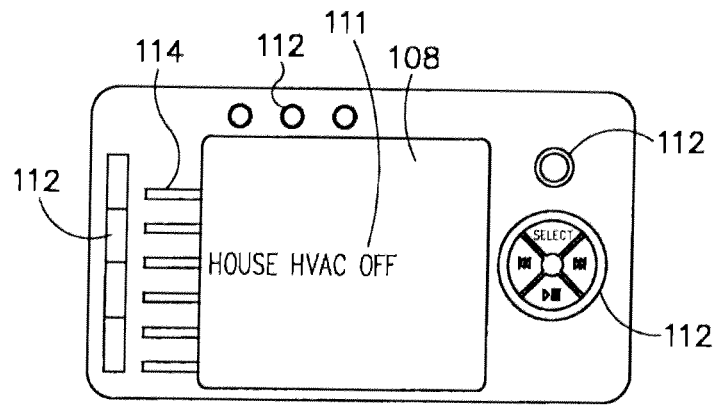
FIGS. 9A-D are illustrations of utilizing the integrated system while traveling, according to exemplary embodiments.

Referring to FIGS. 9A-9D, user 60 may choose to manually communicate with residential control system 50 over communication network 16 from vehicle 10 to control residential devices. In FIG. 9A, user 60 adjusts heating, ventilation, or air conditioning (HVAC) settings in residential environment 12 via in-vehicle control system 106 using vocal commands or manual selection (e.g. via pushbuttons 114 or knobs 112) and power usage of the HVAC system can be monitored. In-vehicle control system 106 may display a power usage and/or command signal graphic 111 on display.

Figure 9B:
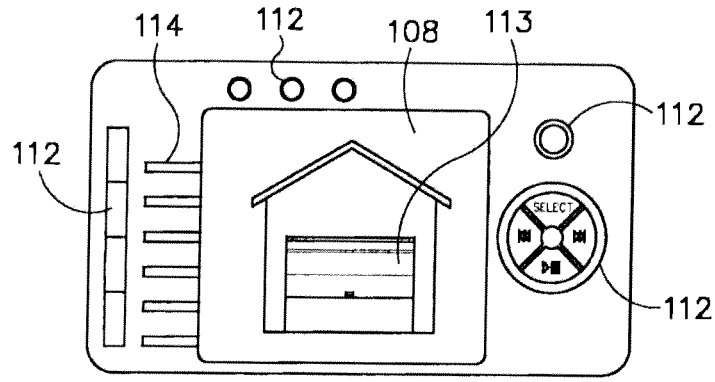

In FIG. 9B, in-vehicle control system 106 may provide graphical or audible confirmation of various other information related to residential environment 12 based on wireless communication with residential control system 50. For example, in-vehicle control system 106 may display a garage door graphic 113 or audibly play a sound confirming that garage door 66 has closed.

Figure 9C:
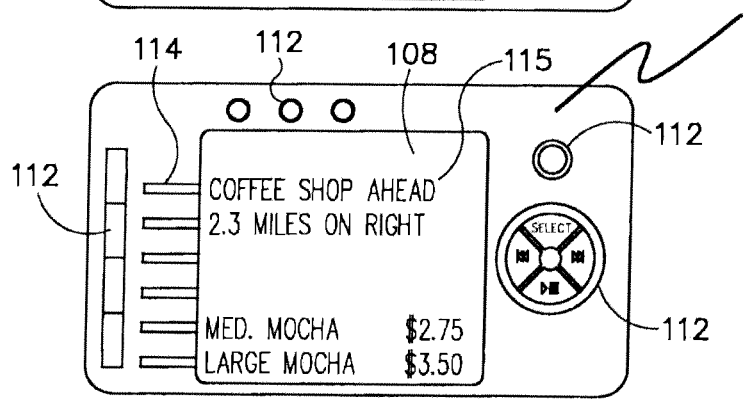

In FIG. 9C, in-vehicle control system 106 may, automatically or manually, play back or display any data files that may have been downloaded from residential control system 50. In-vehicle control system 106 may be configured to automatically display information related to a POI when vehicle 10 is within a certain proximity as detected by a vehicle global positioning system (GPS) or other location determination system. For example, in-vehicle control system 106 may transmit a coffee shop alert 115 to user 60 when approaching a coffee shop. A menu may be displayed that allows user 60 to order various items from the coffee shop via vocal command or manual selection. In-vehicle control system 106 may then connect with mobile electronic device 64, for example mobile phone 30, via a wireless connection network to transmit user's 60 order to the coffee shop when vehicle 10 is a predetermined or user 60 defined distance away.

User 60 may pull into the coffee shop driveway where in-vehicle control system 106 transmits an encrypted personal identification number of user 60 to complete the transaction from vehicle 10 via mobile electronic device 64, such as mobile phone 30. The coffee shop may award user 60 with a credit for facilitating them in making an electronic order. The electronic order may also decrease the wait time user 60 waits in line. While user 60 is waiting for the order, downloaded video content may playback on in-vehicle control system 106.

Figure 9D:
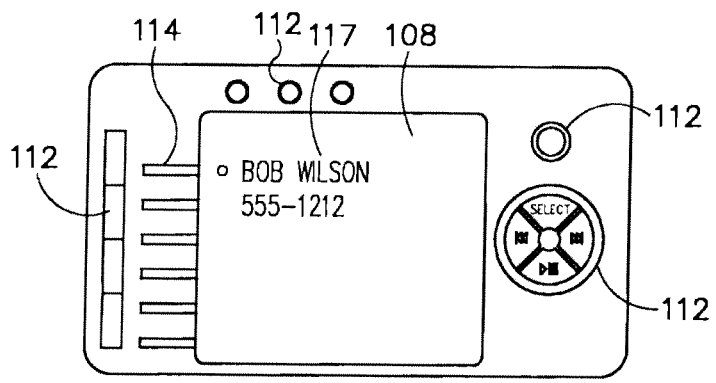

In FIG. 9D, user 60 is driving to work, in-vehicle control system 106 may transmit a telephone call alert 117 to the display or give an audio prompt that a telephone call is incoming on mobile electronic device 64. User 60 may press a button on in-vehicle control system 106 or provide a vocal command to accept the telephone call.

In FIG. 10, user 60 arrives at a desired destination and parks vehicle 10, he or she may continue the telephone conversation on mobile electronic device 64. Mobile electronic device 64 may also automatically lock the vehicle doors and/or engage a vehicle alarm system via a wireless network as user 60 is walking away.

User approaches office environment 14, office control system 18 may automatically recognize user's 60 access privileges via information transmitted from mobile electronic device 64 over communication network 16. As user 60 enters office environment 14, any mobile electronic devices 64 using a cellular communication network may switch to a wireless fidelity (WiFi) or other wireless network (e.g. IEEE 802.16) to communicate with office environment's 14 wireless network infrastructure. Once switched to office environment's 14 network, mobile electronic devices 64 may download user's 60 schedule or other information that may be of use throughout the day. User 60 does not need to go to his or her desk to work as any work-related information desired can be downloaded to mobile electronic device 64.

In FIG. 10, user 60 may download a data file from office environment 14 in a similar manner to when user 60 was at residential environment 12, he or she may drag the file from office control system 18 (e.g. a computer) to vehicle 10 icon to transfer the file to vehicle 10 or mobile electronic device 64 icon to transfer the file to mobile electronic device 64.

Once a file is selected, office control system 18 transmits the file to in-vehicle control system 106 or to a selected mobile electronic device 64 using communication network 16. Communication network 16 may include an IEEE 802.11 protocol, an IEEE 802.15 protocol, an IEEE 802.16 protocol, a cellular signal, a Shared Wireless Access Protocol-Cord Access (SWAP-CA) protocol, an infrared protocol, or any other suitable wireless technology. Depending on the proximity of mobile electronic device 64 to in-vehicle control system 106, in-vehicle control system 106 may switch between protocols for improved signal strength and data integrity.

In FIG. 11, user 60 is driving towards residential environment 12. In the process of driving to residential environment 12, if a file was transferred to in-vehicle control system 106, user 60 may open the file on in-vehicle control system 106 using a vocal command or manual selection (e.g. via pushbuttons) to find the file. The file may then be manipulated as desired by the user. For example, user 60 may ask in-vehicle control system 106 a vocal command to convert the file to a phonemic representation using a text-to-grammar engine and read the file to user 60.

When vehicle 10 comes within a predefined proximity to user's 60 residence, as determined by a GPS or other location determination system, in-vehicle control system 106 may remotely interface with residential control system 50 over communication network 16. For example, in-vehicle control system 106 may automatically transmit a signal to residential control system 50 to open garage door 66 and provide visual or audible confirmation that garage door 66 is being opened.

When user 60 pulls into driveway 68, in-vehicle control system 106 may further communicate with residential environment. For example, garage door 66 may close as vehicle 10 is parked, residential environment's 12 doors may be unlocked, the HVAC system may be set to a predetermined comfort level, an audio system may begin playback of media, etc.

It should be understood that these embodiments are offered by way of example only. Accordingly, the present disclosure is not limited to a particular embodiment, but extends to various modifications that nevertheless fall within the scope of the appended claims. The order or sequence of any processes or method steps may be varied or re-sequenced according to alternative embodiments.

Describing the disclosure with figures should not be construed as imposing on the disclosure any limitations that may be present in the figures. The present disclosure contemplates methods, systems and program products on any machine-readable media for accomplishing its operations. The embodiments of the present disclosure may be implemented using an existing computer processors, or by a special purpose computer processor for an appropriate vehicle system, incorporated for this or another purpose or by a hardwired system.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software implementations of the present disclosure could be accomplished with standard programming techniques with rule based logic and other logic to accomplish the various connection steps, processing steps, comparison steps and decision steps.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. An in-vehicle control system for communicating data between at least one of an office control system and a residential control system comprising:
   a transceiver configured to be in communication with the at least one of the office control system and the residential control system;
   a memory device in communication with the transceiver wherein the memory device is configured to store a data file received from the at least one of the office control system and the residential control system, the data file related to a point of interest; and
   a processing device coupled to the transceiver and the memory device, wherein the processing device is configured such that the data file is automatically displayed or audibly played by the in-vehicle control system when the vehicle is within a certain proximity of the point of interest as detected by a vehicle global positioning system.

2. The in-vehicle control system of claim 1, further comprising a vehicle location device; and
   wherein the processing device is further configured to initiate communications with at least one of the office control system and the residential control system based on a predetermined distance parameter.

3. The in-vehicle control system of claim 1, wherein a data stored on the office control system, residential control system and the in-vehicle control system is synchronized.

4. The in-vehicle control system of claim 1, further including a navigation system.

5. The in-vehicle control system of claim 1, further including an in-vehicle control display screen, wherein the in-vehicle control display screen is a touch screen.

6. The in-vehicle control system of claim 1, wherein the in-vehicle control system can be controlled by an audible command.

7. The in-vehicle control system of claim 1, further comprising a vehicle location device and a location of interest circuit, wherein the location of interest circuit is configured to determine a location of interest and transmit a location of interest signal to the in-vehicle control system.

8. The in-vehicle control system of claim 7, wherein the location of interest signal is transmitted to an in-vehicle control system display.

9. The in-vehicle control system of claim 7, wherein a location of interest menu screen is displayed on an in-vehicle control system display.

10. The in-vehicle control system of claim 7, further comprising a payment authorization circuit, wherein the payment authorization circuit is configured to transmit a purchase signal to the location of interest.

11. The in-vehicle control system of claim 1, wherein the in-vehicle control system is configured to be in communication with a portable computing device.

12. The in-vehicle control system of claim 11, wherein the in-vehicle control system is configured to initiate a vehicle function based on a predetermined distance of the portable computing device from the in-vehicle control system.

13. The in-vehicle control system of claim 12, wherein the vehicle function is unlocking a door.

14. The in-vehicle control system of claim 12, wherein the vehicle function is turning on a vehicle.

15. The in-vehicle control system of claim 12, wherein the portable computing device is configured to be in communication with the office control system and the residential control system.

16. The in-vehicle control system of claim 1, wherein a residential function is initiated based on a predetermined distance from a residence to the vehicle.

17. The in-vehicle control system of claim 16, wherein the residential function is opening a garage door.

18. The in-vehicle control system of claim 16, wherein the residential function is adjusting a HVAC temperature.

19. The in-vehicle control system of claim 1, wherein the processing device is further configured to switch the in-vehicle control system from a first wireless protocol to a second wireless protocol based on an increase in signal strength and an increase in data integrity when using the second wireless protocol.

20. The in-vehicle control system of claim 16, wherein the residential function comprises:
   verifying one or more doors of the residence are locked,
   activating a fire alarm system, and
   activating a security alarm system; and
   wherein the initiation of the residential function is further based on an indication that the vehicle is started.

* * * * *